United States Patent [19]

Griebeler

[11] 4,289,950
[45] Sep. 15, 1981

[54] NARROW GAP WELDING APPARATUS

[75] Inventor: Elmer L. Griebeler, Cleveland Heights, Ohio

[73] Assignee: C-R-O, Inc., Menomonee Falls, Wis.

[21] Appl. No.: 39,216

[22] Filed: May 15, 1979

[51] Int. Cl.³ .............................................. B23K 9/12
[52] U.S. Cl. ......................... 219/124.34; 219/137.42; 228/9
[58] Field of Search ...................... 219/124.34, 137.42, 219/137 R, 124.22; 228/8, 9

[56] References Cited

U.S. PATENT DOCUMENTS

| 3,281,047 | 10/1966 | Weicht | 219/124.34 |
| 3,328,556 | 6/1967 | Nelson et al. | 219/137 R |
| 3,826,888 | 7/1974 | Garfield et al. | 219/137.42 |
| 3,924,094 | 12/1975 | Hansen et al. | 219/124.34 |
| 3,924,095 | 12/1975 | Lucas, Jr. | 219/124.34 |
| 3,997,757 | 12/1976 | Cecil et al. | 219/124.34 |
| 4,121,746 | 10/1978 | Frohlich et al. | 219/124.34 |

FOREIGN PATENT DOCUMENTS

| 44-6450 | 3/1969 | Japan | 219/124.34 |
| 50-38383 | 12/1975 | Japan | 219/124.34 |
| 228189 | 8/1968 | U.S.S.R. | 219/124.34 |

Primary Examiner—C. C. Shaw
Attorney, Agent, or Firm—Andrus, Sceales, Starke & Sawall

[57] ABSTRACT

A probe attached to an extension shaft is disposed within a narrow gap to be welded. The probe is preloaded to bear against one side or edge of the seam to be effected, and is carried on a housing which holds a welding torch, filler-wire feed means, and cooling means.

8 Claims, 8 Drawing Figures

FIGURE 1

NARROW GAP WELDING APPARATUS

BACKGROUND OF THE INVENTION

1. Field of the Invention

The present invention is in the field of devices for the automatic guidance of welding torches; more specifically, this invention is in the field of devices for the guidance of welding torches for effecting welded seams in narrow grooves.

2. Description of the Prior Art

In welding operations generally, it is sometimes necessary to join relatively thick pieces of metal in such fashion that the original juxtapostion of the separate pieces is close with respect to size of the torch, the size of the filler wire, the size of the seam, or any of these.

These are devices known which have approached this problem. For instance, Garfield et al., in U.S. Pat. No. 3,826,888, show an arc-welding torch for welding seams in deep narrow gaps; the configuration of the contact-tube tip causes the weld wire to assume a curve as it is fed out of the end of that tip. The curve in the wire causes it to bear generally into the corner of the joint as the torch moves along. However, Garfield et al. have no provision for guidance of the torch, and have to assume that the joint is substantially uniform. While this assumption is valid in many cases, there are a number of situations where the nature of the joint makes such an assumption an improper one, such as e.g., where the joint comprises compound angles, variations in width, assembly tack welds, and the like.

One solution to the problem of non-uniformity of the joint is found in Ujiie, U.S. Pat. No. 3,746,833, where a narrow gap is filled in one pass by the use of three weld wires in effecting the seam. The three wires permit the use of relatively thin pieces, while at the same time feeding a large net amount of filler into the joint. By the process described by Ujiie, two of the thin wires fill the corners of the joint with ample allowance for imperfections and irregularities, and the third wire fills any spaces left between the first two wires. As with Garfield et al., Ujiie uses no guidance per se, relying on either a pre-programmed system or an assumption that the joint will not deviate more than the inherent ability of the three-wire method to accommodate.

Nelson et al., in U.S. Pat. No. 3,328,556, show one means of guidance of the torch in a process for narrow-gap welding. A spring clip is provided, affixed to a contact tube carrying the filler wire; as the spring clip traverses the wall of the piece to be welded, irregularities in the wall are detected, and the contact tube is maintained at substantially the same distance from the wall. This method, however, relies on the assumption that irregularities in the wall are the same as those at the joint intersection, i.e., if there is a dip or bulge at the line where the spring clip follows, that dip or bulge will also occur at the joint interface.

It will be apparent to those skilled in the art that Garfield et al. and Ujiie do not guide the torch, and that Nelson et al. use a guidance system which may or may not cause the system to track the seam itself, as opposed to a reference line near, but not at, the joint.

In the case of arc-welding torches, there is also the problem of maintaining the filler wire discrete from the weld seam or the work until the wire is at the point where the weld is to be effected. Because the filler wire is necessarily at a different electrical potential from the work, either the wire must be insulated from the torch and permitted to touch the work only where desired, or the wire and torch, at the same potential, must be isolated from the work, with only the wire, as above, permitted to touch the work at the point of the weld. There are systems known which impart a bend to the filler wire before its approach to the weld seam, such that the end of the wire tends to sweep back and forth on the seam. This approach, however, necessarily means that the seam is welded with an overabundance of wire rather than only the proper amount, at the place where desired.

A futher problem which exists with attempts to solve the difficulties encountered in effecting welds in narrow gap is that of properly blanketing the weld area to prevent oxidation of the molten metal. Where a nozzle has been used to direct gas toward the weld area, the turbulence caused by the gas velocity tends to cause atmospheric oxygen to be entrained. Substituting a gas-diffusion system, comprising a gas passage in the torch and a sintered-bronze exit chamber near the end of the torch where the weld is effected, requires the use of uneconomically large amounts of inert gas, and further can cause the waste heat from the welding operation to be retained within the gas envelope. The retained heat then causes the apparatus to become hotter than is proper for efficient operation.

SUMMARY OF THE INVENTION

The apparatus of the present invention comprises a narrow torch, means for cooling the torch, means for providing a blanketing atmosphere if desired, and guidance means for the torch, where the guidance means comprises at least one probe finger preloaded to bear against a surface of the piece to be welded. The method of the present invention comprises effecting a weld in a narrow gap by the action of a narrow welding torch having cooling means and gas-blanketing means incorporated therein, the torch being guided in response to signals generated by the action of at least one probe finger, where the probe finger is biased against a surface of the piece to be welded.

BRIEF DESCRIPTION OF THE DRAWINGS

FIG. 1 is a view in section of the torch and probe of the apparatus;

DESCRIPTION OF THE PREFERRED EMBODIMENTS

Figure 2:
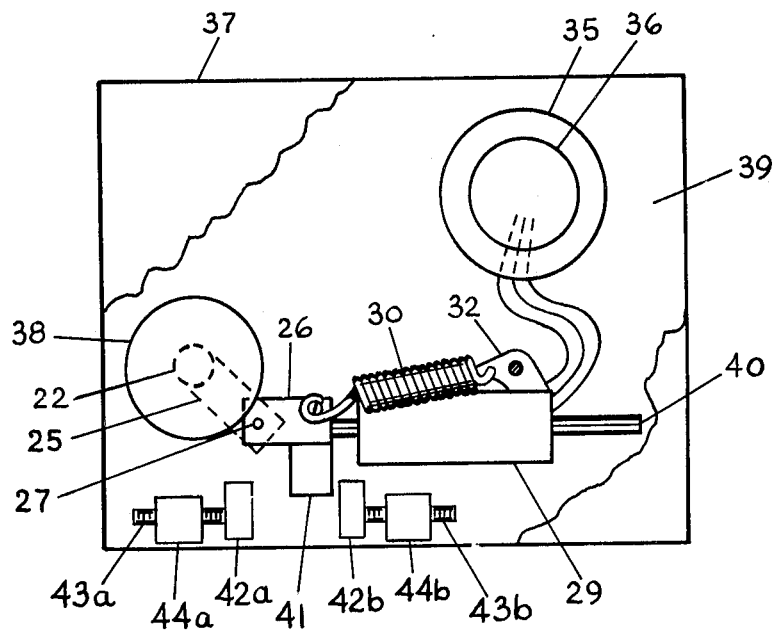
FIG. 2 is a partial cutaway view of the sensing means taken on line 2—2 of FIG. 1.

The preferred embodiment of the apparatus of the present invention comprises a torch and guidance assembly having cooling means and gas-blanketing means incorporated therein, welding means, and at least one probe finger biased to bear against a surface to be welded. The preferred method of the present invention comprises effecting a welded seam in a narrow gap by heating the pieces to be welded with a welding torch, the torch having cooling and gas-blanketing means affixed thereto or integral therewith, adding filler metal to the seam, and guiding the apparatus by at least one probe finger bearing against a surface to be welded.

Figure 1:
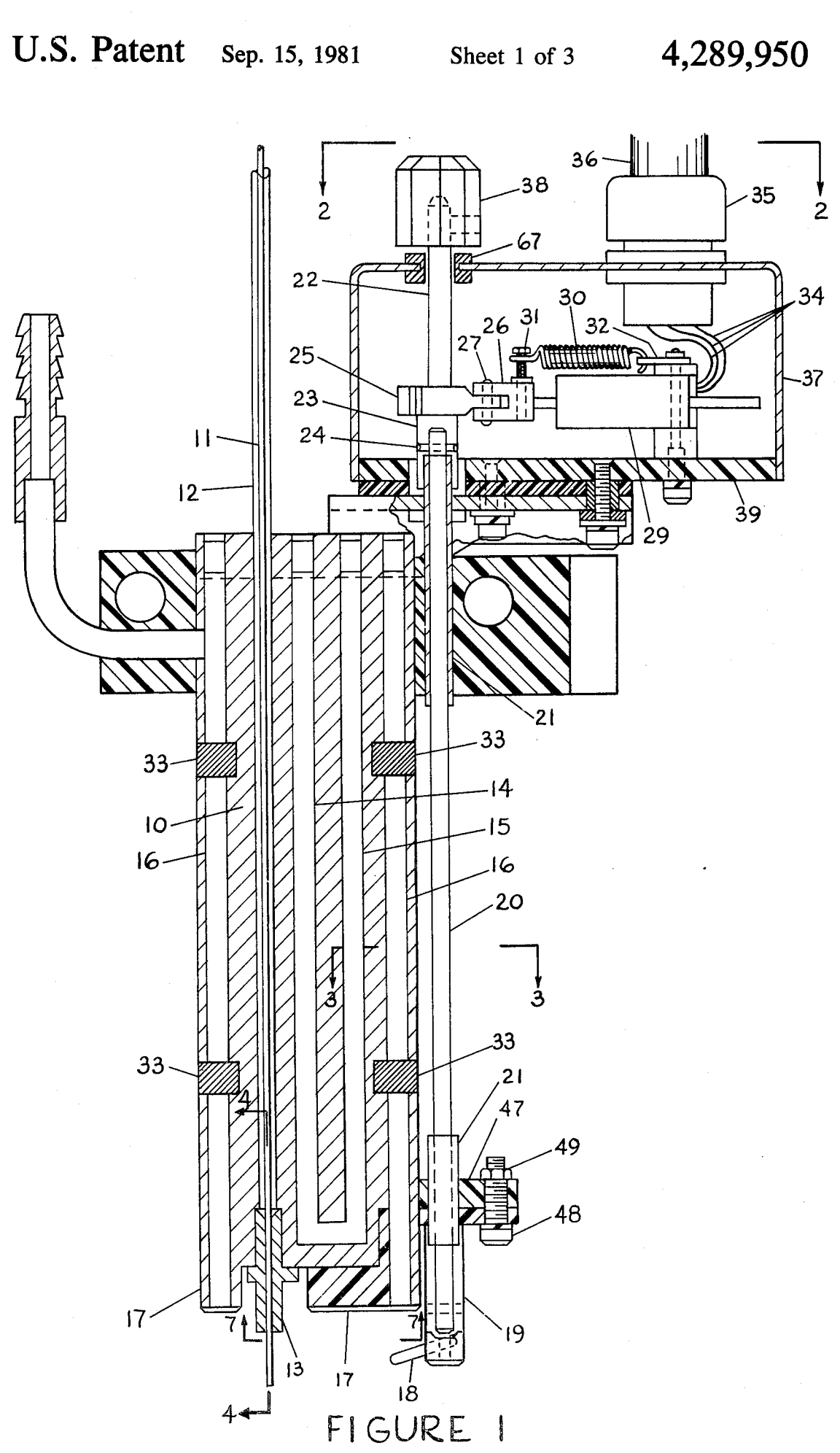

Referring to FIG. 1, there is shown a view in section of the body 10 of the torch of the present invention. The torch shown is an arc welder, but those skilled in the art will realize that a gas welding device is within the scope and spirit of this invention. Electrode and filler wire 11 is disposed within guide 12, which can be a hole or channel in body 10.

Exit collar 13 is formed of an electrically conductive material having high thermal stability, and is conveniently made of berylium-copper or tungsten-copper alloy, although those skilled in the art will realize that the composition is not critical to the scope and spirit of the present invention, so long as it has the desired characteristics. Coolant passages 14 and 15 are provided for the flow of coolant, generally water, through the torch body to remove the heat from the welding operation.

Because of the nature of the welding operation with which the apparatus of the present invention is used, it is generally undesirable to use flux because the problem of flux removal in the narrow gap would present difficulties. Therefore, the torch is provided with passages 16 in the body thereof for blanketing gas such as, e.g., carbon dioxide, helium, argon or other fluid useful in keeping atmospheric oxygen away from the site of the joint during the welding process. The blanketing gas exits through outlets 17, formed of berylium-copper or other suitable material to withstand the heat of the welding operation. Outlets 17 are described more fully in connection with FIG. 7.

An angular probe finger 18 is affixed such as by friction or mechanical fastening to finger adapter 19 which is in turn affixed to a generally vertical rototable probe shaft 20. Insulating sleeves 21 maintain shaft 20 in electrical isolation from torch body 10 and from mounting plate 39; torch body 10 is necessarily at a different potential from the work, while finger 18 and shaft 20 are at ground potential, or the same as the work. Probeshaft extension 22 is connected to probe shaft 20 by any convenient means which will insure corresponding motion between the two, and is shown here as insulating collar 23, affixed to shaft 20 by pin 24 passing through both members.

Clamp arm 25 is affixed by any suitable means such as clamping or pinning to probe-shaft extension 22, and is in turn pivotally affixed to clevis 26 by means of pivot pin 27. Shaft 28 is rigidly affixed to clevis 27, and is disposed within position sensing means 29. This mechanism is described also in reference to FIG. 2.

Means 29 comprises a device to detect relative motion, and can be a potentiometer, rheostat, optical sensor, transducer, or other device whose electrical output can be made a function of mechanical input. In FIG. 1, it is conveniently shown as a potentiometer. Spring 30 is shown disposed between screw or pin 31 and spring retainer 32, and serves to urge clevis 26 and shaft 28 toward means 29 as set forth more fully herein below.

In effecting welds by the arc process, a potential gradient is necessary between the electrode 11, which is also the filler wire for the welded joint, and the work, not shown in FIG. 1. Because electrode 11 is not electrically insulated from body 10 of the torch, that body is at the same potential as the electrode, and necessarily different from the work. Because of this difference in electrical potential, there exists the possibility of a massive current flow between the work and the torch body 10 if the two come into contact; there are therefore conveniently provided insulating pads 33 to prevent contact of the torch with the work. The pads 33 are preferably made of a material with a high dielectric and thermal resistance, such as, e.g., ceramic or quartz.

Wires 34 leading from means 29 carry appropriate signals to the guidance logic and torch-positioning means, as described more fully hereinbelow; wires 34 go through connector 35 into conduit 36 and to the guidance means. Connector 35 is affixed to cover 37 which serves to protect means 29 and the mechanism close to it from thermal, electrical and mechanical interference. Knob 38 is affixed to that portion of probe-shaft extension 22 which projects through grommet 67 in cover 37. The function of knob 38 is described with reference to FIG. 2. Cover 37 is detachably affixed to mounting plate 39, which is rigidly affixed to torch body 10. Means 29 is rigidly affixed to plate 39. Plate 39 is an electrically nonconductive material.

In FIG. 2, which is a partially cut-away view taken along lines 2—2 in FIG. 1, there is shown a top view of means 29 and the mechanism which carries motion from probe shaft 20 thereto. Knob 38 is shown mounted concentrically with probe-shaft extension 22, to which there is affixed clamp arm 25. Clamp arm 25 is pivotally connected to clevis 26 by pin 27. Clevis 26 is integral with shaft 40, by which relative motion of probe-shaft extension 22 is transmitted to, and sensed by, means 29.

There is further affixed to clevis 26 an arm 41, disposed to bear against stops 42a and 42b, which are adjustable by threaded shafts 43a and 43b disposed within threaded means 44a and 44b, affixed to mounting plate 39. By suitable adjustment of stops 42a and 42b, the net movement of the mechanism connected with shaft 22 is constrained in order to prevent overtravel and possible damage to means 29 or to probe finger 18.

Figure 3:
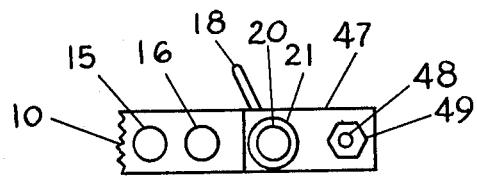
FIG. 3 is a partial sectional view of the torch, showing the probe and taken on line 3—3 of FIG. 1.

FIG. 3 is a partial view in section of the torch body, taken along lines 3—3 in FIG. 1. Torch body 10 is shown, with coolant passage 15 and blanketing-gas passage 16 disposed therewithin. Probe shaft 20 has insulating sleeve 21 juxtaposed between it and the body of the torch. Block 47 is held in place by screw 48 and nut 49. Block 47 serves to maintain shaft 20 in place and to provide support for insulating sleeve 21. Probe finger 18 is shown extending from shaft 20. It will be realized that the torch body, and all the apparatus that moves within the opposing walls of the narrow gap, are necessarily narrower than the gap to be welded.

Figure 4:
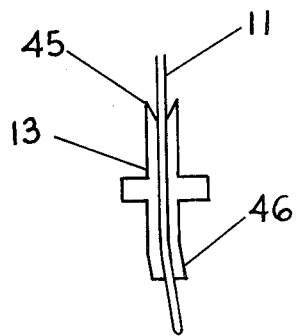
FIG. 4 shows a detail of the exit collar of the torch and is taken on line 4—4 of FIG. 1.

FIG. 4 is a sectional view of exit collar 13, taken along lines 4—4 in FIG. 1. Electrode and filler wire 11 is shown passing through throat 45 of the exit collar; lower portion 46 of the exit collar imparts a slight bend or curve to wire 11. It has been determined that about 15° is useful, but a greater or lesser amount of curvature is within the scope and spirit of the present invention. By causing wire 11 to curve as it exits from collar 13, the wire is made to bear into the junction of the pieces to be welded.

In the operation of the present invention, the apparatus is placed into the narrow gap to be welded, generally by lowering it from above. Before the apparatus is lowered, the operator manually turns knob 38 to selectively cause probe finger 18 to clear the wall of the gap. After the apparatus is far enough into the gap to permit finger 18 to bear against the wall thereof, the operator releases knob 38, and the biasing action of spring 30, functioning through the rotary connecting mechanism, causes finger 18 to be urged against a wall. It is necessary to the operation of the method of the present invention that the probe finger bear against the same side of the seam as does the filler wire 11. Thus, if the probe finger 18 bears against the right wall, viewed with respect to the direction of travel of the apparatus relative to the work, exit collar 13 must be disposed within body 10 to cause the wire 11 also to curve toward the right.

With the apparatus in the desired position, the probe finger 18 will be resting against the right wall, just above the line of the seam to be welded, by means which will be set forth more fully hereinbelow. In this state, means 29 is adjusted to report a null condition; that is, the logic should direct the apparatus to move neither left nor right. As the work and apparatus move in relation to each other, the wall may move relative to the finger 18, with the finger being continuously urged to the right by the action of spring 30 acting through the intervening mechanism on shaft 20 and thus on the finger.

If the wall moves relatively away, i.e., to the right, spring 30 causes finger 18 to continue to bear against the wall, as hereinabove described, causing shaft 20 to move, and shaft 40 to move relative to the body of means 29. An electrical signal is produced by means 29, responsive in sign and magnitude to the motion of finger 18, and transmitted to the control logic. The signal from the control logic is transmitted to guide means driving the torch holder. If the wall moves relatively to the right, the guide means drives the torch to the right until the finger returns to the null position, at which time the signal from means 29 returns to zero, and the guide means causes no left or right motion of the torch.

In order to maintain probe finger 18 correctly with respect to the seam effected by the apparatus of the present invention, the length of exit collar 13 is chosen to provide filler wire 11 at the joint to be welded relatively below the line traced on the work by finger 18. In practice, this may be done by adjusting either the length of collar 13 or finger adapter 19. Ideally, a line traced by finger 18 would be just covered by the filler metal deposited by the action of the torch. While those skilled in the art will realize that finger 18 could bear against any part of the vertical surface of the workpiece, it should be noted that the closer it is to the seam line, the more precisely is the finished seam a reflection of the actual juncture of the metal pieces to be joined.

Probed finger 18, shaft 20 and other portions of the mechanism used to transmit relative motion from the weld face to means 29 are maintained at ground potential, or the same relative potential as the pieces to be welded, in order to minimize or eliminate electrical signals in the vicinity of means 29. Because body 10 is carried at a different potential from the work, the probe mechanism and parts attached to it must be insulated from body 10. This function is served by sleeves 21, shown in FIGS. 1 and 3. Mounting plate 39 can itself also be formed of an insulating material such as ceramic, phenolic plastic or quartz, or it can be mounted on such a material, further to effect such electrical isolation.

The entire mechanism comprising the torch and probe finger is positioned and maintained with respect to the bottom, or floor, of the weld seam, by sensing means described and claimed in U.S. Pat. Nos. 4,099,110 to Zeewy, et al. and 3,997,757, to Cecil et al., both patents being assigned to same assignee as the present invention. In those patents there are disclosed, inter alia guidance logic, probes for detecting a seam to be welded, and for following vertical changes in a horizontal path. Circuit means provide driving force for positioning motors to maintain the apparatus at a desired distance from the floor of the weld seam.

Figure 5:
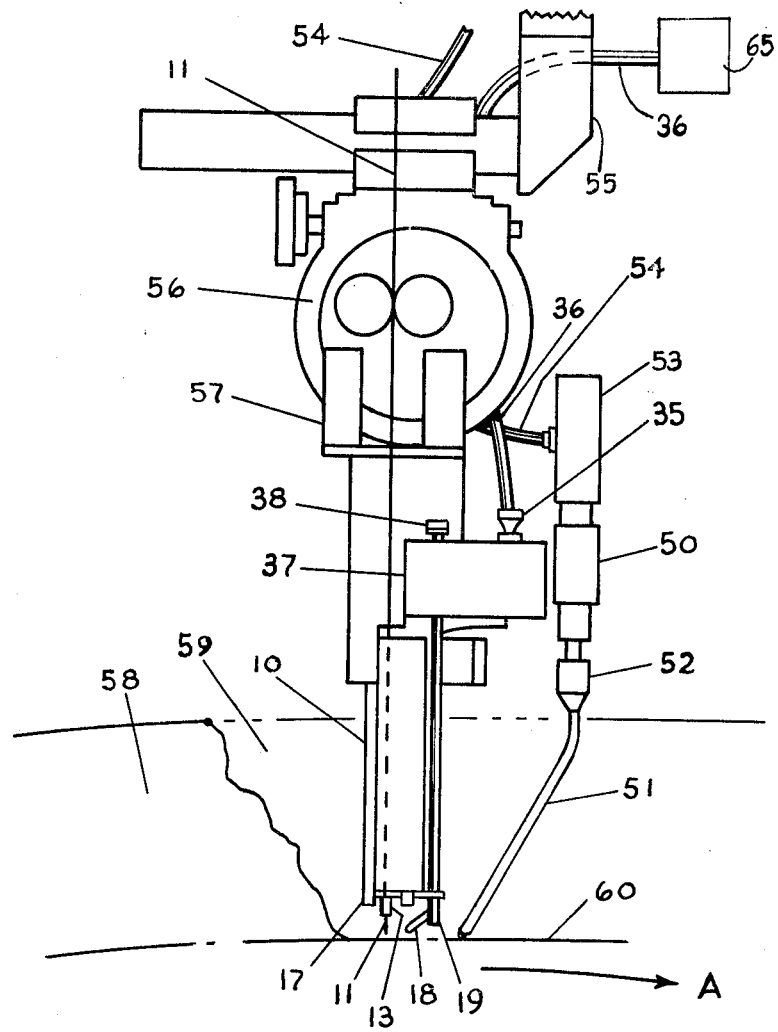
FIG. 5 is a plan view of apparatus embodying the invention.

FIG. 5 shows one embodiment of the apparatus of the present invention, having a leading probe 50 for providing vertical-component control, such as disclosed in U.S. Pat. No. 3,997,757 or 4,099,110. Probe 50 comprises probe finger 51 attached by holder 52 to position sensing unit 53; signals generated by the probe are transmitted along wires through conduit 54 to drive motors, not shown, for raising and lowering the apparatus. Wires in conduit 36 are connected to guidance means 65.

Support arm 55 carries wire-feed motor 56, to which torch body 10 is affixed by mounting means 57, such as a bracket bolted to the torch 10 and to the motor 56; however, the nature of the mounting means 57 is within the knowledge of those skilled in the art, and forms no part of the invention.

In operation of the method of the present invention, the torch assembly is shown in place in a narrow gap between workpieces 58 and 59; workpiece 58 is shown partially cut away in the foreground. The torch assembly moves relative to the work in the direction shown by the arrow A. As the torch moves, probe finger 51 bears against the bottom surface, or floor, 60 of the seam. As the floor of the seam moves in the vertical plane, this motion is detected by finger 51 moving in response thereto. The motion of finger 51 is in turn sensed by sensing unit 53, and the signals generated in response thereto are transmitted through wires in conduit 54 to drive motors, not shown.

As with probe finger 18, the sensing device for vertical movement is placed in the narrow gap to be welded, and probe finger 51 allowed to contact the bottom surface 60; the signal from sensing unit 53 is then set to zero. As finger 51 traverses the seam, signals therefrom will correspond in magnitude and sign to the change in the bottom surface; these signals will cause the appropriate drive motors to move the unit up or down, in an amount and direction dependent upon the signal.

As described hereinabove, probe finger 18 bears against one wall of the surface to be welded, and variations in that wall are detected by finger 18, and signals transmitted from means 29 cause drive motors to move the torch 10 in the horizontal plane. Thus, as the apparatus moves in relation to the work, it is moved vertically or horizontally, or both, in response to the shape of the seam.

In order to weld a seam, the apparatus is lowered into the narrow gap, the output signals from the probes set to zero, and the means to drive the torch relative to the work is engaged. The sensing means then cause the apparatus to maintain the same relative position with respect to the floor and one wall of the seam as the apparatus moves. Filler wire 11 is fed either at a uniform rate based upon the relative speed of the torch, or at a rate responsive to its consumption, as determined by means known to those skilled in the art, which means form no part of the present invention.

The apparatus of the present invention can function without the vertical-component probe finger 51, if the bottom surface is substantially uniform, or if minor variations therein are not detrimental to the weld, as where the rate of deposition of wire 11 is adequate to fill the seam.

It will be apparent to those skilled in the art that a narrow gap can be completely welded from the bottom to a properly convex condition at the surface by repeated passes of the apparatus through the gap, each seam serving as the floor for the succeeding seam. It is further apparent that such a gap can be filled by using a number of the apparatus of the present invention in a ganged fashion, such as one having a finger 18 bearing against one wall, and a second one bearing against the opposite wall, each apparatus causing a weld to be made in a vertex of the angle made between the vertical and horizontal pieces.

Figure 6:
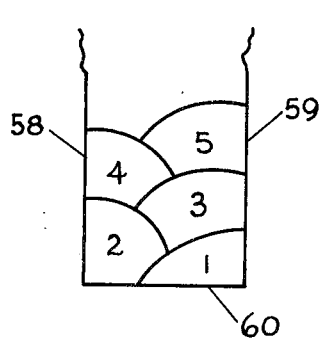
FIG. 6 is a sectional view of a weld made by the method of the present invention.

Another apparatus, or multiple thereof, can follow the first, laying beads on top of the first bead; in the alternative, the first apparatus, or pair thereof, can simply be raised by the thickness of the seam, and caused to track the gap repeatedly until the gap has been completely welded as set forth hereinabove. FIG. 6 shows a typical pattern of seams which would result from the operation of the apparatus as herein described. Walls 58 and 59 are shown substantially, though not necessarily, perpendicular to bottom surface 60. The first seam 1 is made at the juncture of wall 59 and floor 60; second seam 2 is made, either separately and independently, or by ganged apparatus, at the vertex of wall 58 and floor 60, and overlaps seam 1, thus completely welding floor 60 and the two walls 58 and 59. Repeat or ganged apparatus then causes seams 3, 4, 5, and as many as are necessary for completion of the weld, to be deposited in the gap.

While the penetration of the weld into the base metal has not been shown for clarity of presentation, those skilled in the art will be aware that each seam penetrates into, and fuses with, all the metal surfaces it contacts. The finished weld is thus effectively a single homogenous piece of metal.

Figure 7:
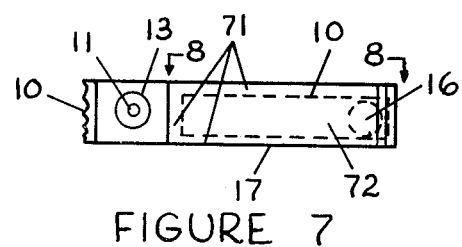
FIG. 7 is a partial plan view taken along lines 7—7 of FIG. 1.

Gas outlet 17 is shown in more detail in FIG. 7, which is a view taken along lines 7—7 of FIG. 1. Gas passage 16 permits blanketing gas to flow around edges 71 of outlet 17 toward the workpieces 58 and 59, not shown in FIG. 7, and toward the weld area immediately adjacent to exit collar 13 and filler wire 11. The gas flow is through passage 16 in body 10, along outlet base 72, and out toward the workpieces and weld area. The flow of gas from outlet 17 thus creates a gas wall around the weld, without blanketing the weld area with a static gas envelope which holds heat in the region of the weld. The configuration shown in FIG. 7 has an advantage over a simple nozzle in that there is a minimum amount of turbulence, and effectively no atmospheric oxygen reaches the molten metal at the region of the weld.

Figure 8:
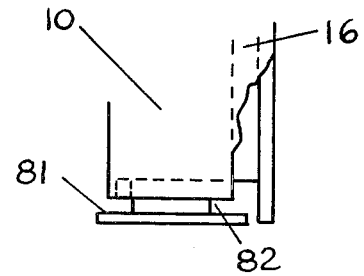
FIG. 8 is a partial cutaway view taken along lines 8—8 of FIG. 7.

FIG. 8 is a view partly in section taken along lines 8—8 of FIG. 7, showing the torch body 10 with gas passage 16 vertically disposed therein outlet base 81 affixed to body 10, and horizontal passage 82 formed by body 10 and base 81. The flow of gas as illustrated is also an improvement over the use of a sintered-metal porous fixture at or near the weld region, where the blanketing gas is diffused around the weld. It has been noted that this latter method requires large amounts of gas, while the apparatus described here uses about the same amount as needed from a gas nozzle, but without the turbulence problem.

Modifications, changes and improvements to the present forms of the invention herein disclosed, described and illustrated may occur to those skilled in the art who come to understand the principles and precepts thereof. Accordingly, the scope of the patent to be issued herein should not be limited to the particular embodiments of the invention set forth herein, but rather should be limited by the advance by which the invention has promoted the art.

What is claimed is:

1. Apparatus for affecting a weld seam in a narrow gap formed by opposing walls of the members to be joined, comprising:
   (a) a torch body having guide means for a filler wire,
   (b) a generally vertical probe shaft mounted to said body,
   (c) an angular probe connected to the lower end of said probed shaft and adapted for contact with the walls of the gap,
   (d) biasing means connected to the upper end portion of said probe shaft to rotate the latter so that said probe normally engages a wall of the gap during welding,
   (e) and selectively actuatable means connected to said probe shaft for rotating the latter and said probe against the force of said biasing means.

2. The apparatus of claim 1 wherein said probe shaft is connected to position sensing means.

3. The apparatus of claim 2 wherein said biasing means comprises a spring connected between said probe shaft and said position sensing means.

4. The apparatus of claim 1 or 3 which includes stop means disposed adjacent said biasing means to prevent overtravel of said probe under the influence of said biasing means.

5. The apparatus of claim 2 which includes means disposed at the lower end of said torch body to impart a curve to said filler wire in a direction toward the same wall of the gap as that normally engaged by said probe shaft.

6. The apparatus of claim 5:
   (a) wherein said curve imparting means comprises an exit collar for said filler wire,
   (b) said exit collar having a curved lower portion.

7. The apparatus of claim 1 or 5:
   (a) wherein the said gap has a floor,
   (b) and which includes further probe means for engaging said floor and connected to second position sensing means.

8. The apparatus of claim 7 which includes insulating sleeve means mounted to said probe shaft for maintaining the latter in electrical isolation from said torch body.

* * * * *